(12) United States Patent
Liao et al.

(10) Patent No.: US 7,584,319 B1
(45) Date of Patent: Sep. 1, 2009

(54) CONNECTION MANAGEMENT IN SERIAL ATTACHED SCSI (SAS) EXPANDERS

(75) Inventors: Heng Liao, Belcarra (CA); Kuan Hua Tan, Burnaby (CA); Calvin Leung, Burnaby (CA)

(73) Assignee: PMC-Sierra, Inc., Santa Clara, CA (US)

( * ) Notice: Subject to any disclaimer, the term of this patent is extended or adjusted under 35 U.S.C. 154(b) by 440 days.

(21) Appl. No.: 11/390,182

(22) Filed: Mar. 28, 2006

Related U.S. Application Data

(60) Provisional application No. 60/666,724, filed on Mar. 31, 2005.

(51) Int. Cl.
*G06F 13/00* (2006.01)
(52) U.S. Cl. .......................... 710/317; 710/38; 370/357
(58) Field of Classification Search ................. 710/104, 710/36, 316–317, 38; 370/357, 362
See application file for complete search history.

(56) References Cited

U.S. PATENT DOCUMENTS

| 7,133,405 | B2 * | 11/2006 | Graham et al. | 370/392 |
| 7,376,147 | B2 * | 5/2008 | Seto et al. | 370/465 |
| 2006/0101171 | A1 * | 5/2006 | Grieff et al. | 710/36 |

* cited by examiner

*Primary Examiner*—Clifford H Knoll
(74) *Attorney, Agent, or Firm*—Mukundan Chakrapani; Borden Ladner Gervais LLP

(57) ABSTRACT

A method and apparatus are provided for implementing connection management in SAS expander devices. SAS expanders are commonly used within a SAS network topology to allow multiple disk drives to connect to multiple host devices. The method and apparatus provides arbitration of connection requests to be setup or removed among multiple end devices and expander devices so as to increase system performance and reduce hardware cost in a standard compliant manner.

12 Claims, 18 Drawing Sheets

CYCLE 0

| SMP port | | |
|---|---|---|
| Phy 11 | 13-bit pa_map | 64-bit sas address |
| Phy 10 | 13-bit pa_map | 64-bit sas address |
| Phy 9 | 13-bit pa_map | 64-bit sas address |
| Phy 8 | 13-bit pa_map | 64-bit sas address |
| Phy 7 | 13-bit pa_map | 64-bit sas address |
| Phy 6 | 13-bit pa_map | 64-bit sas address |
| Phy 5 | 13-bit pa_map | 64-bit sas address |
| Phy 4 | 13-bit pa_map | 64-bit sas address |
| Phy 3 | 13-bit pa_map | 64-bit sas address |
| Phy 2 | 13-bit pa_map | 64-bit sas address |
| Phy 1 | 13-bit pa_map | 64-bit sas address |
| Phy 0 | 13-bit pa_map | 64-bit sas address | entry_valid[12:0]: 1 0 0 0 0 0 0 0 0 0 0 0 1

PA_MAP[12][12:0]
PA_MAP[11][12:0]
PA_MAP[10][12:0]
PA_MAP[9][12:0]
PA_MAP[8][12:0]
PA_MAP[7][12:0]
PA_MAP[6][12:0]
PA_MAP[5][12:0]
PA_MAP[4][12:0]
PA_MAP[3][12:0]
PA_MAP[2][12:0]
PA_MAP[1][12:0]
PA_MAP[0][12:0]

Notes: Updating SAS address for PHY 0. No change to PA_MAP (default value).

↓

CYCLE 1

| SMP port | | |
|---|---|---|
| Phy 11 | 13-bit pa_map | 64-bit sas address |
| Phy 10 | 13-bit pa_map | 64-bit sas address |
| Phy 9 | 13-bit pa_map | 64-bit sas address |
| Phy 8 | 13-bit pa_map | 64-bit sas address |
| Phy 7 | 13-bit pa_map | 64-bit sas address |
| Phy 6 | 13-bit pa_map | 64-bit sas address |
| Phy 5 | 13-bit pa_map | 64-bit sas address |
| Phy 4 | 13-bit pa_map | 64-bit sas address |
| Phy 3 | 13-bit pa_map | 64-bit sas address |
| Phy 2 | 13-bit pa_map | 64-bit sas address |
| Phy 1 | 13-bit pa_map | 64-bit sas address |
| Phy 0 | 13-bit pa_map | 64-bit sas address | entry_valid[12:0]: 1 0 0 0 0 0 0 0 0 1 0 0 1

PA_MAP[12][12:0]
PA_MAP[11][12:0]
PA_MAP[10][12:0]
PA_MAP[9][12:0]
PA_MAP[8][12:0]
PA_MAP[7][12:0]
PA_MAP[6][12:0]
PA_MAP[5][12:0]
PA_MAP[4][12:0]
PA_MAP[3][12:0]
PA_MAP[2][12:0]
PA_MAP[1][12:0]
PA_MAP[0][12:0]

Notes: Updating SAS Address for PHY 3. Updating Row and Column 0 of PA_MAP.

| | 1-bit | 1-bit | 1-bit | 1-bit | N-bit |
|---|---|---|---|---|---|
| Phy 0 | search done | direct match | table match | sub match | tgt_pa_map |
| Phy 1 | search done | direct match | table match | sub match | tgt_pa_map |
| | ... | ... | ... | ... | ... |
| Phy N-1 | search done | direct match | table match | sub match | tgt_pa_map |

CONNECTION MANAGEMENT IN SERIAL ATTACHED SCSI (SAS) EXPANDERS

CROSS REFERENCE TO RELATED APPLICATIONS

This application claims the benefit of priority of U.S. Provisional Patent Application Ser. No. 60/666,724 filed on Mar. 31, 2005, which is incorporated herein by reference.

FIELD OF THE INVENTION

The present invention relates generally to Serial Attached Small Computer System Interface (SCSI) (alternatively Serial Attached SCSI or simply SAS) devices. More particularly, the present invention relates to connection management issues in such SAS topologies and SAS expander devices.

BACKGROUND OF THE INVENTION

SAS is a connection-oriented protocol that allows storage devices, like servers and disk drives, to communicate through a network of high-speed serial physical interconnects. Connections among the host devices—e.g., Host Bus Adapters (HBAs)—and target hard disk drives (HDDs) are managed by the intermediate devices called SAS expanders. The SAS expanders act as connection management agents, much like a switch element, having physical connections to multiple host devices or disk drives simultaneously.

The SAS protocol specifies a protocol stack that provides serial physical interconnect that can be used to connect together storage devices such HDDs and HBAs. SAS protocol specifies the transport layers protocols to transport SCSI commands, Serial Advanced Technology Attachment (alternatively Serial ATA or simply SATA) commands, and management commands among storage devices. The protocol is used in conjunction with SCSI and SATA command sets. The SAS protocol defines the function of a SAS expander device, which is part of the service delivery subsystem and facilities communication between SAS devices. In the general sense, the SAS expanders provide the switching and routing function among the SAS devices that are attached to the SAS expander.

Multiple SAS end devices and SAS expander devices can be connected together to form a SAS topology. There can be one or multiple physical links connecting each pair of the neighbouring devices. When there is a single physical link (i.e., "phy") between two devices, the associated phy on the SAS device is called a narrow port which physical link has a dedicated SAS Address. When there are multiple physical links connecting two devices, the associated phys on an expander are considered to be a single wide port as all the associated phys are using the same dedicated SAS Address. In other words, all links of a wide port are considered to be a common logical link from a routing perspective, although it allows multiple simultaneous connections to pass through the wide port at the same time.

The SAS topology can be as simple as connecting multiple SAS end devices through a single SAS Expander device to an HBA, or as complex as connecting multiple SAS end devices through multiple SAS Expander devices to multiple HBA devices in a tree structure. Each SAS end device, SAS Expander device, and HBA device has a unique dedicated SAS Address. The connection between SAS end device to SAS Expander device or HBA device must be a narrow port whereas the connection between SAS expander devices or between SAS expander device and HBA device, can be a narrow port (one physical link) or a single wide port (multiple physical links).

The SAS protocol adopts the point-to-point connection mechanism. The SAS end device and HBA device have to communicate to each other through OPEN request. The OPEN request from a HBA device or SAS end device has to flow through a single SAS Expander device or multiple SAS Expander devices to reach the SAS end device or HBA device. The SAS Expander has to perform a point-to-point connection in order to route the OPEN request from the source phy to the target phy. The communication link is considered setup when an OPEN request from the SAS end device is accepted by the HBA device, or an OPEN request from the HBA device is accepted by the SAS end device. At this point, information can be transferred between the HBA device and SAS end device.

The OPEN requests from Multiple SAS end devices or HBA devices can reach the SAS Expander device at the same time. The SAS Expander has to resolve multiple OPEN requests targeted for different destination phys at the same time by connecting the request source phy to the target source phy one at a time according to the request priority. When there are multiple source phys requesting to be connected to the same target phy, an arbitration process is required to resolve the connection priority.

The SAS Expander device supports the least-recently used arbitration fairness as defined in SAS protocol. The least-recently used arbitration fairness is designed such that the longer the open request has been queuing up, the higher priority request will win the arbitration. The arbitration priority comprises three parameters: the Arbitration Wait Time (AWT), the request PHY SAS Address, and the Connection Rate (CONNRATE). The AWT indicates the amount of time the source phy has been waiting for the connection to the target phy. The Arbiter looks at the AWT, SAS Address, and Connection Rate in the ascending order when performing the arbitration. If two source phys that are queuing for the same target phy have the same AWT, the SAS Expander device looks at the SAS Address of the source phys. The source phy that has the largest SAS Address wins the arbitration. If both source phys have the same AWT and SAS Address, the source phy that has the highest connection rate wins the arbitration. In the case where the AWT, SAS Address, and CONNRATE are the same for the source phys, the SAS Expander device arbitrarily picks a winner from the source phys.

The AWT, SAS Address, and CONNRATE form the arbitration priority key for the request phy. If the SAS Expander device has N physical links, the SAS Expander device may receive up to N OPEN requests at the same time. Because the SAS topology adopts a point-to-point protocol, the SAS Expander device has to arbitrate and connect the crossbar by selecting the OPEN request phy with the highest priority key one at a time. The situation becomes more complicated as the SAS topology allows narrow port and wide port connection. If a physical link with the highest priority key is requesting a connection to the wide port whose physical links are also requesting but with lower priority keys, the SAS Expander has to connect the highest priority phy to the lowest priority phy within the wide port.

Arbitration rules are specified in the American National Standards Institute (ANSI) standard related to SAS, but the implementation is not explicitly specified nor readily apparent. The SAS expander is a connection-oriented switch/router based on the arbitration rules defined by the SAS standard. The number of physical links supported by the SAS expander and the adoption of an effective searching and sorting algorithm can significantly impact the cost and performance of the SAS expander, hence effecting the overall network performance.

There are no known techniques that address the connection management problem in SAS topology. While there are of course well know connection management algorithms for all kinds of circuit switches, SAS differs significantly from prior protocols due to the strategy of "reserve and wait" nature of handling routing congestion. Most of the prior protocols take "give up and retry" strategy in case of congestion so prior algorithms do not satisfy SAS topology requirements.

It is, therefore, desirable to provide an approach that provides connection management in the SAS topology.

SUMMARY OF THE INVENTION

It is an object of the present invention to obviate or mitigate at least one disadvantage of previous connection management approaches.

The present invention provides a method and apparatus to connect and manage the physical connection between end devices.

In a first aspect, the present invention provides an apparatus for connection management in networked devices, the apparatus including: a broadcast primitive processor arranged between an input and an output of the apparatus; an expander connection router arranged between the input and the output; and an expander connection manager operatively coupled to the expander connection router and arranged between the input and the output; wherein the expander connection manager arbitrates connection requests between the input and the output.

In another aspect, the present invention provides a method of connection management in networked devices, the method including: providing broadcast primitives between an input and an output of the apparatus by way of a broadcast primitive processor arranged between the input and the output; routing data between the input and the output by way of an expander connection router arranged between the input and the output; and arbitrating the routing of the data by way of an expander connection manager operatively coupled to the expander connection router and arranged between the input and the output.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIGS. 7 and 7a illustrate is a block diagram showing updating of the direct route storage;

DETAILED DESCRIPTION

Figure 1:
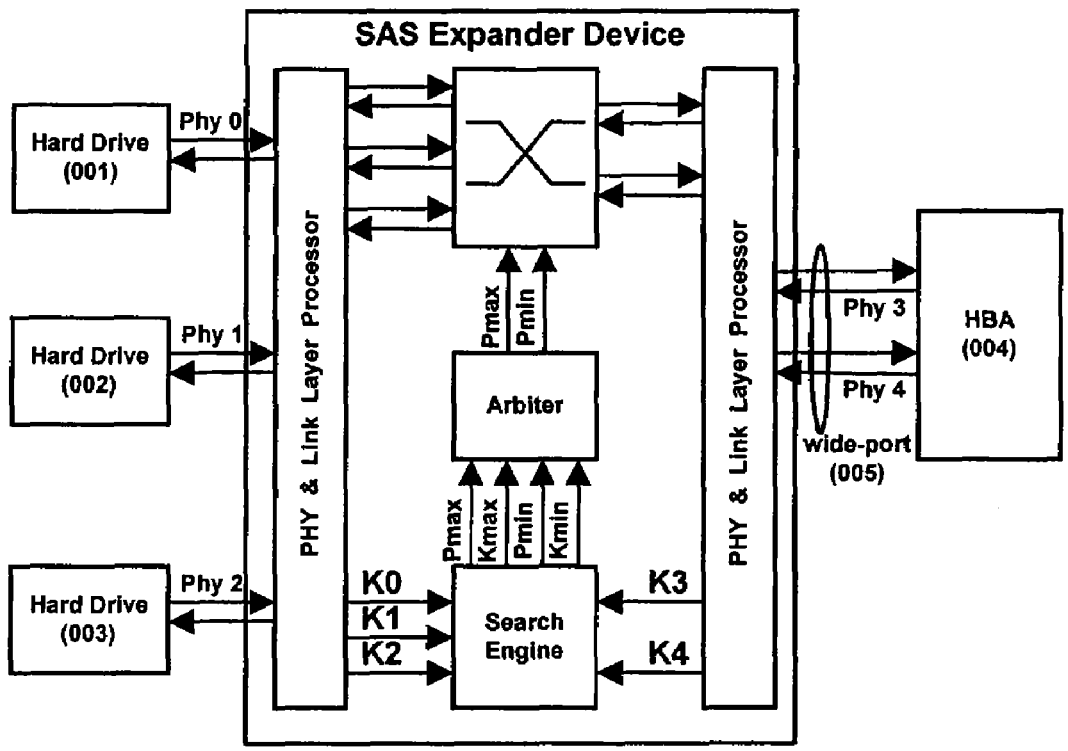
FIG. 1 shows a SAS expander device block diagram with an arbiter block in accordance with the present invention.

Generally, the present invention provides a method and apparatus for implementing connection management in SAS expander devices. SAS expanders are commonly used within a SAS network topology to allow multiple disk drives to connect to multiple host devices. Common SAS topology defined by the relevant ANSI standard only describes a general protocol of how the connection requests should be setup or removed among multiple end devices and expander devices. There is no specific connection management methodology that defines how to select the highest priority request from the source phy and connection it to the destination phy. A good Expander Connection Manager/Router (ECMR) architecture can make a lot of difference in terms of system performance and hardware cost. The present invention includes improved ECMR architectures to perform the connection management protocol within the confines of the relevant ANSI specification.

Embodiments of the present invention address the implementation of the Priority based Connection Manager in SAS topology and SAS Expander devices. However, the same concept is also applicable to any priority based connection issue in non-SAS devices. As described earlier, a SAS topology can contain a number of hosts, targets and expander devices. The SAS Expander is a multiple port device providing switching functionality among host, target and other expander devices allowing any device to exchange information with any other device in the topology. To setup a connection between the request source phy and target phy, the Expander Connection and Management Router (ECMR) should:

1. Accept the IDENTIFY frame presented by the end device or adjacent SAS expander. The ECM is only allowed to proceed with OPEN connection after the end device/expander phy has successfully identified itself to the ECM. The IDENTIFY frame is a 32-byte data frame with CRC protection. The link processor within the SAS Expander may be used to extract the identify information and presented to the ECM.

2. Accept the OPEN frame presented by the end device or adjacent SAS expander. The OPEN frame is a 32-byte data frame with CRC protection. The link processor within the SAS Expander may be used to extract the OPEN request and presented to the ECM for further processing.

3. Effectively prioritize the OPEN requests from the input phys. As the number of phys is increased in the SAS Expander, the number of simultaneous OPEN requests presented to the ECM is also increased. Therefore, an effective search and prioritize engine is required to sort the OPEN requests before arbitration can be carried out.

4. Arbitrate and assign/deny path resources for OPEN requests according to AWT fairness algorithm, pathway recovery rules, direct routing, subtractive routing and table routing methods as specified in the SAS related ANSI standard.

5. Configure and setup the ECR crossbar to route the OPEN frame from the source phy to the target phy if the connection request is accepted. Tear down the ECR crossbar and terminate the connection if the source phy and target phy has finished transmission.

6. Accept and process the broadcast primitive request (BPP) from the end device or adjacent expander. Broadcast the BPP to the appropriate target phys if required.

FIG. 1 illustrates a simple SAS configuration that includes one SAS Expander Device, an HBA device and three SAS end devices. The HBA (004) is connected to the SAS Expander Device (000) through a wide port that comprises Phy 3 and Phy 4 physical links. The three SAS end devices (001, 002, 003) are connected to the SAS Expander Device through three narrow ports (Phy 0, Phy 1, Phy 2). After performing phy negotiation with the expander, the SAS end devices (001, 002, 003, 004) will send IDENTIFY frames to the expander. The link layer processor will extract the end device identify information and memorize it in the ECMR. The BPP change primitive will also be initialized by the link processor whenever an end device is attached or removed from the expander. The ECMR has to broadcast the BPP change primitive to the other phys (either adjacent expander or HBA) to inform the status change in the expander due to adding or removing expander port or end devices.

The end device will also initiate an OPEN frame to the expander whenever it needs to store or extract data from the target end device. The Link Layer Processor in the SAS Expander device extracts the source SAS address, target SAS address and the arbitration key from the OPEN frame and present them to the ECMR. Multiple OPEN frames can be sent to the ECMR from different end devices. Therefore, the ECMR has to prioritize the OPEN frames according to the arbitration keys and connect the highest priority OPEN request phy to the idle target phy or the target phy with the least priority OPEN request.

Figure 2:
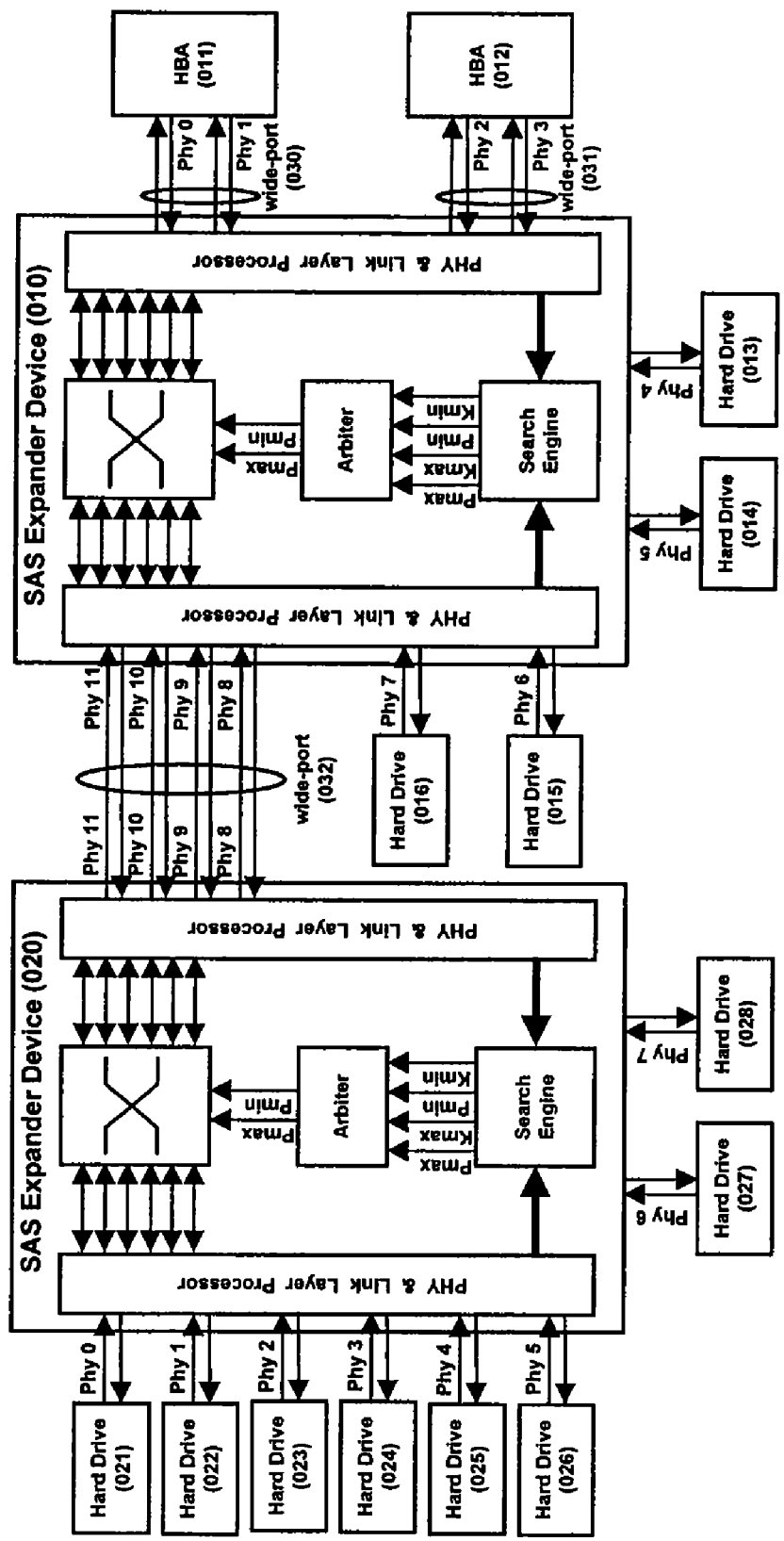
FIG. 2 shows a two SAS expander devices of FIG. 1 together in cascade.

FIG. 2 illustrates a SAS configuration that includes two SAS Expander Devices, two HBA devices and a plurality of SAS end devices. In FIG. 2, the SAS Expander device (010) includes 12 physical links with four physical links connected to two HBA devices (011 and 012), four physical links connected to four hard drives (013 to 016) and four physical links connected to the expander device (020). There are three wide-port and four narrow-port configurations, with two wide-port physical links (030) connected to HBA (011), two wide-port physical links (031) connected to HBA (012), four wide-port physical links (032) connected to expander device (020) and four narrow-port physical links each connected to a hard drive.

Similarly, the SAS Expander device (020) includes 12 physical links with four physical links connected to the expander device (010) and eight physical links connected to hard drives (021 to 028). There are one wide-port and eight narrow-port configurations, with four wide-port physical links connected to the expander device (010) and eight narrow-port physical links each connected to a hard drive. The ECMR in expander 010 has to deal with more sophisticated OPEN request issues as there are several wide ports involved in the arbitration.

Figure 3:
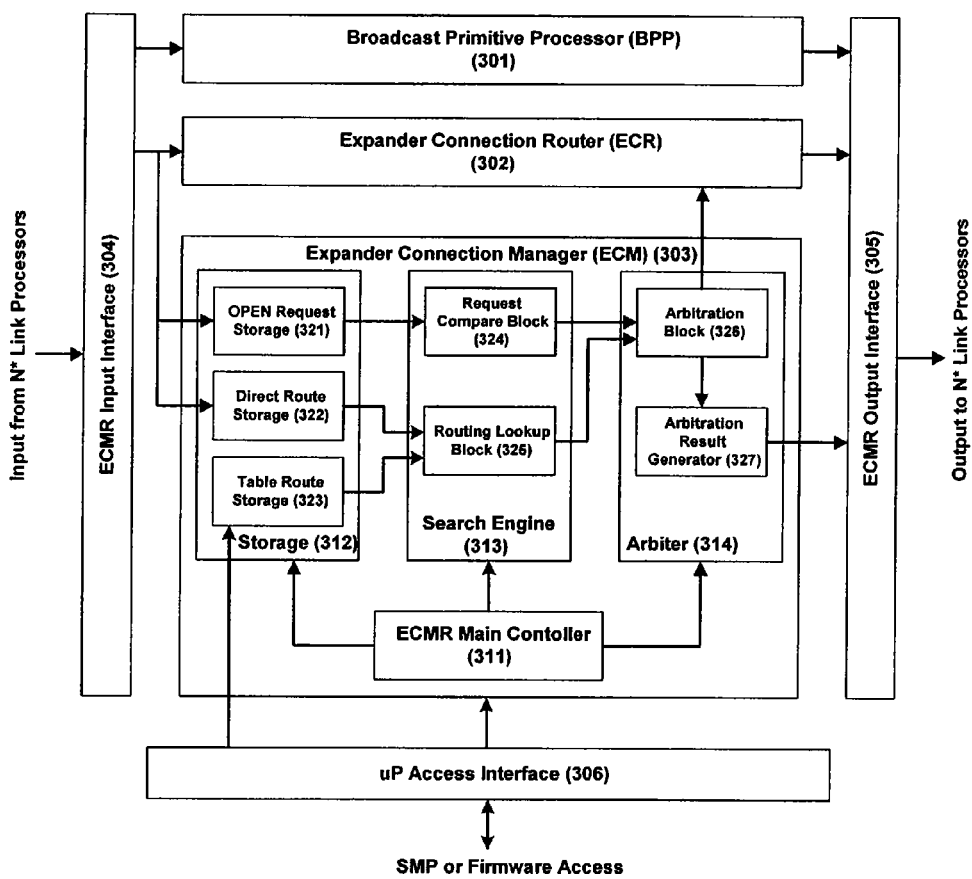
FIG. 3 shows the expander connection manager/router (ECMR) block architecture for SAS expander devices as shown in FIGS. 1 and 2.

FIG. 3 shows the block architecture of the Expander Connection Management Router according to an embodiment of the present invention. This can alternatively be described as a Connection and Management Router for use in a SAS expander. The ECMR comprises a micro-processor Interface that allows the firmware or application layer processor to program the ECMR. An input interface and output interface are also provided which basically sample the input and output signals from/to the adjacent blocks so that the ECMR can be designed as a stand alone macro. The main functions of the ECMR are provided in 3 sub-modules that include the Expander Connection Manager (303), the Expander Connection Router (301) and the Broadcast Primitive Processor (302).

The Expander Connection Manager (303) includes the ECMR main controller (311) that is operably connected to a mechanism for storage (312), a search engine (313) and an arbiter (314). The mechanism for storage includes an OPEN request storage (321), a direct route storage (322), and a table route storage (323). The search engine (313) includes a request compare block (324) and routing lookup block (325). The arbiter (314) includes an arbitration block (326) and an arbitration result generator (327). The request compare block (324) and arbitration block (326), include two comparison matrixes. One matrix is for request arbitration, and the other matrix is for pathway block deadlock prevention.

For primitive broadcast with regard to the Broadcast Primitive Processor (302), the ECMR receives broadcast primitive requests from each PHY and requests transmission of those requests to all the enabled PHYs except those PHYs that belong to the same wide port as the request PHY. There are three different ways to configure BPP processing: method 1) hardware BPP filtering via BPP_FORWARDB; method 2) hardware BPP filtering via BPPCFG; and method 3) firmware assisted BPP processing. Of those BPP processing schemes, the two hardware BPP filtering schemes are the easiest to use and require no continual firmware intervention. Firmware assisted BPP processing is implemented to support Distributed Topology Master. The last scheme, being the most flexible, works in collaboration with the link processor to offload the complete BPP processing function to firmware. The implementation of method 1 and method 2 will not be described here as such are described in co-pending U.S. patent application Ser. No. 11/326,508 filed on Jan. 6, 2006, entitled "SERIAL ATTACHED SCSI BROADCAST PRIMITIVE PROCESSOR FILTERING FOR LOOP ARCHITECTURES" which claims priority from U.S. Provisional Patent Application Ser. No. 60/641,778 filed on Jan. 7, 2005, each of which is incorporated herein by reference.

Figure 4:
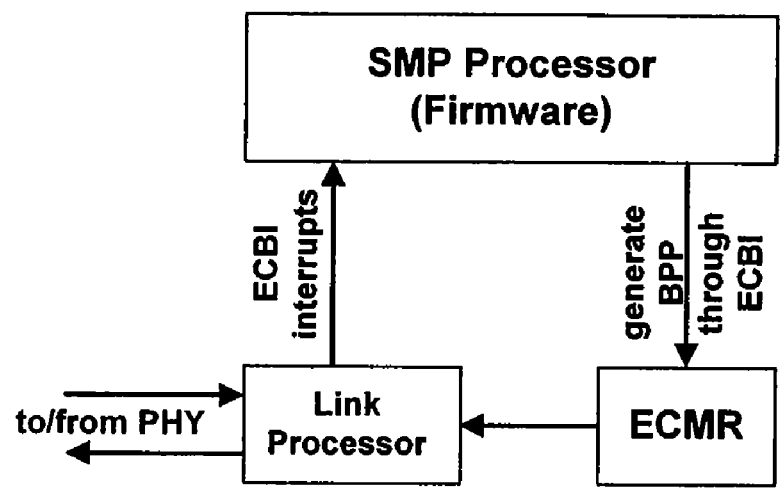
FIG. 4 shows a generalized diagram of BPP broadcast through firmware control.

The method 3 basically transfers the BPP broadcasting task to firmware and allowing the firmware to perform BPP broadcasting. FIG. 4 illustrates the inter-operation block diagram between Link Processor, ECMR, and SMP processor. When there is an incoming BPP received from the line, or the link processor is required to initiate a BPP broadcast, interrupt bits will be set through ECBI register. Upon detecting the BPP interrupts from link processors, the firmware will perform the required task (e.g. SMP discovery etc) and then generate the BPP broadcast to other link processors (except the link processors in the same wide port that it received the BPP) through ECMR.

Figure 5:
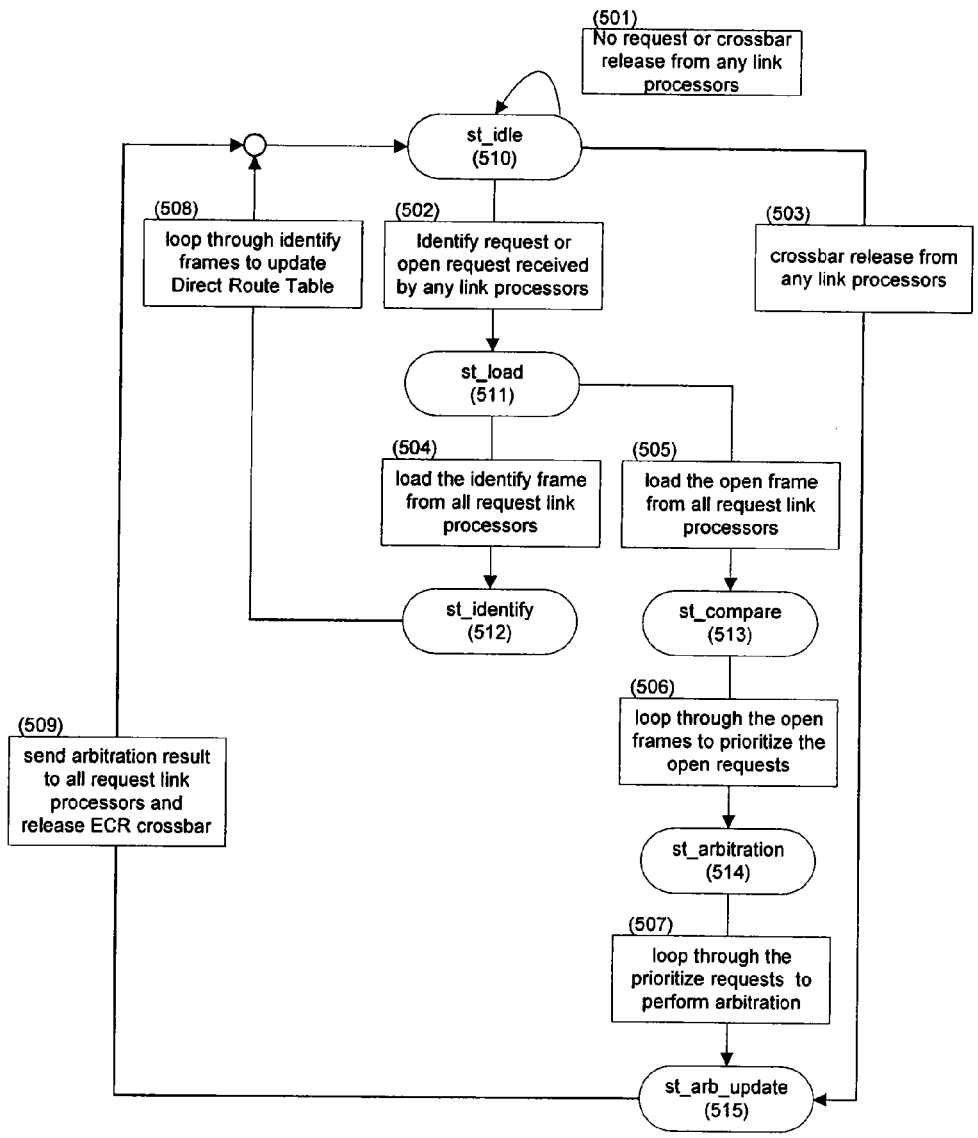
FIG. 5 shows a state diagram for an expander connection management main controller.

As shown in FIG. 3, the Expander Connection Manager (ECM) includes 3 major blocks: storage blocks (312), search engine (313), and arbiter (314). These three blocks each carry out different function with each operation synchronized through the Main Controller (311). FIG. 5 defines the processing flow for the main controller (311). The main controller includes 6 states: the idle state (510), the loading state (511), the identify state (512), the compare state (513), the arbitration state (514) and the arbitration result update state (515). The state transition of the main controller is based on the input signals from all the link processors.

As shown in FIG. 5, the main controller will advance from the idle state to the next state based on three conditions. If there is no request or crossbar release acknowledgement signal from any link processors (501), the main controller will stay in idle state and keep monitoring the input signals from all link processors. If there is a request from any link processors (502), the main controller will advance to loading state (511) where either the identify frame or open frame will be loading into the storage block. If there is no request from the link processors but there is a crossbar release acknowledge signal from any link processor (503), the main controller will advance to the arbitration result update state (515) where it will release the crossbar and update the arbitration result to request link processors.

When the main controller is in the loading state, it will issue the control signals to the request link processor(s) to load the open frame or identify frame into the open request storage block (321). After loading the identify/open frames into the request storage block, the main controller will decide which operation to be performed based on the type of requests it has received from the link processors. If there is any identify request received from any link processor, the main controller will advance to the identify state (512). In the identify state, the ECM will loop through all the phys that have received the identify frame and update the direct route table (508). The main controller will then advance to the idle state again to monitor the request from all the link processor again. For any mix of identify frames and open frames from the link processors, the main controller will only load the identify frames. This step is preferred such that the link processor notices that the ECM has updated the direct route table and it can advance to the next state to generate an open request or to receive an open frame from another link processor. The open frames in the mix frames condition will only be processed in the next arbitration cycle when the identify request link processors are ready to receive an open frame through the ECR crossbar.

If the main controller receives open frames only in the loading state, it will move to the compare state where the ECM will start performing the open request priority key comparison. The Search Engine will loop through all the open requests and prioritize the comparison result in the request compare block (324). After all the open requests have been compared, the main controller will advance to the arbitration state (514) and perform the arbitration. The ECM will perform the arbitration by going through the priority list to connect the highest priority open request to the non-request phy or the lowest priority open request phy one at a time. After all the open requests have been arbitrated, the main controller will advance to the arbitration update state where the ECM will generate the arbitration result back to the link processors. In this state, the ECM will also look at the crossbar release signals from the link processors and determine if the crossbar needs to be connected or disconnected. The main controller will then move back to the idle state after the arbitration result has been sent to the link processors. The ECM can start the next arbitration cycle when the main controller is back to the idle state again.

The storage block (312) includes three sub modules: open request storage (321), direct route storage (322) and table route storage (323). The open request storage (321) is used to store the open frame from all the link processors so that the ECM can perform the arbitration based on the open frames that are received. This storage block is also used to temporarily store the identify frame that is received from the link processors. The current implementation adopts the data bus time-sharing design which used the ECR crossbar to load the identify or open frames from the link processor if the phy is not in connection. When the phy is in connection, the link processor between source and target phys can communicate to each other and therefore, no open frame is required to arbitrate through the ECM to setup the connection. The data bus time-sharing mechanism significantly reduces the I/O pins of the ECMR design block and reduces the layout congestion issue. Given that each open frame comprises more than 150-bits of data, at least 32-bit data path per phy can be required to load the open frame into the open request storage with acceptable performance. For an expander with N phys (where N is an integer greater than 1), a separate data path to load the open frame into the ECMR may require additional N×32-bit pins. This entails an additional 384 pins for a 12-port expander and 1152 pins for a 36-port expander.

After the identify or open frames are loaded into the open request storage block, the main controller will determine if there is an identify frame received from the link processors. If an identify frame is received from the link processor, the ECM will extract the source SAS address of the given phy and update it to the direct route storage (322). The main controller will then move back to idle state so that it can start the next arbitration cycle again. An arbitration cycle will only be started when the open request storage (321) has pending open frame(s) loaded from the link processors. If there is an identify frame stored in the open request storage block, the arbitration process will not be triggered and the identify frame(s) will be updated into the direct route storage (322). The ECM will move back to idle state and then loading state to re-load the open frames again. The re-loading of the un-process is important as the Arbitration Wait Time (AWT) of all the open frames are updated by the link processors. The Arbitration Wait Time is the indication of how long the open frame has been queuing up for the arbitration. The longer the open frame is in the queue, the higher priority the request phy can be connected to the target phy in the next arbitration cycle.

The direct route storage (322) is used to store the SAS address of the attached phys that have been identified to the expander. The direct route storage is also used to store the wide-port configuration of the identified phys. According to the SAS standard, the end device will send an identify frame to the attached expander to register itself to the expander. If an end device is connected to the expander through a wide-port link with multiple phys, all of the phys that are connected to the same end devices should be identified to the expander using the same SAS address. When the ECM is updating the identify frames of the received phys into the direct route storage, it will first store the received SAS address in the direct route storage and then perform the SAS address comparison to update the wide-port configuration. This process can be repeated until all the identify frames have been updated.

Figure 6:
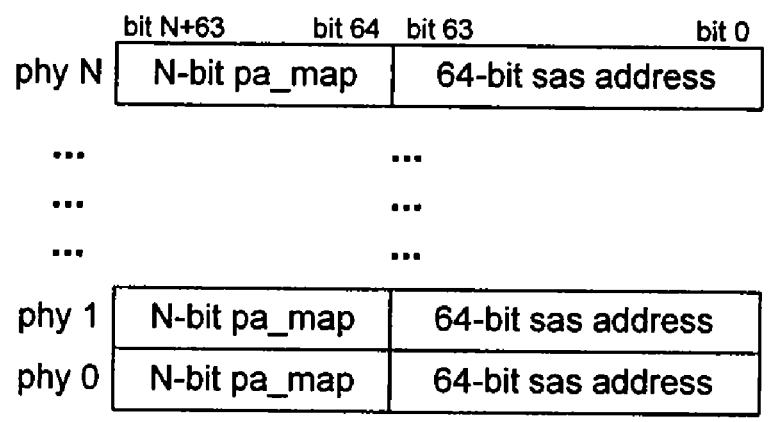
FIG. 6 is an example of direct route storage of attached phys.

FIG. 6 illustrates the direct route storage of the attached phys. For N attached phys, the direct route table can require storage of N×(N+64)-bit of registers/ram. The wide-port configuration is stored as the pa_map (port associate map) that includes N-bits for each phy. For example, if an end device is attached to the expander as a 4 phys wide-port on phy[3:0], then the direct route table entries of phy[3:0] should have the same SAS address and same pa_map of "0 . . . 01111".

Figure 7A:

FIGS. 7 and 7a show an example of updating the identify frame into the direct route storage and calculating the wide-port configuration. This example shows that phy 0, phy 3 and phy 5 are wide-port configuration and the identify frames of all these phys are received at the same time. The direct route entry of phy 0 can be updated first, then entry of phy 3 can be updated and followed by the entry of phy 5.

Figure 8:
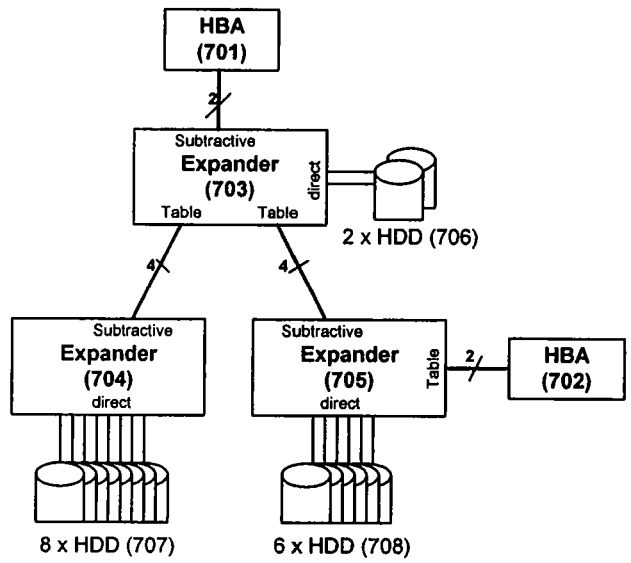
FIG. 8 shows a SAS system having a three expander tree structure.

The table route storage (323) is used to store the SAS address of the routable end devices that are not directly attached to the expander but are connected to another expander in cascade or tree structure. FIG. 8 illustrates a SAS system that includes two Host Bus Adapters (701,702), three expanders (703,704,705) and sixteen hard drives (706,707, 708) directly connected to each expander. The HBA 701 is connected to the expander 703 through two subtractive wide-port. There are 2 hard drives (706) directly connected to expander 703. The HBA 701 should be able to access all the hard drives in the system, therefore the hard drives 707 that are directly attached to the expander 704 are preferably recognized by the expander 703 and stored in the table route storage through SMP PHY discovery. Whenever a hard drive in 707 is attached to the expander 704, a broadcast change is sent to expander 703 that will trigger a phy discovery and the newly added hard drive SAS address will be added to the table route storage of the expander 703. Similarly, when a hard drive in 708 or HBA 702 is attached to the expander 705, a broadcast change is sent and the hard drive or HBA SAS address will be added to the table route storage of the expander 703 at a later stage. Once the SAS address of the end devices are updated in the table route storage, the HBA (701) is able to access those end devices through table route to expander 704 or expander 705.

The table route is based on comparing the destination SAS address that is presented in the open frame to the SAS address that is stored in the table route storage. When a SAS address match is found in the table route storage, the ECM shall connect and route the open frame from the source phy to the target phy that the table SAS address is belonging to. As the expander might be storing hundreds of SAS address in the lookup table, an effective way to lookup the destination SAS address from the table route storage is to use the hash function to convert the 64-bit SAS address into K-bit (where 2K is the maximum number of SAS address the expander can store in the table) of address index key. The ECM will read the K address of the table route storage and compare the SAS address. If there is a SAS address match, the destination SAS address is found and should be connected based on the arbitration result. If there is no SAS address match, the ECM should search through the table link list using the next address key associated with the current table entry. An unmatch table search is declared when the ECM has searched through all the link list and cannot match the destination SAS address.

Figure 9:
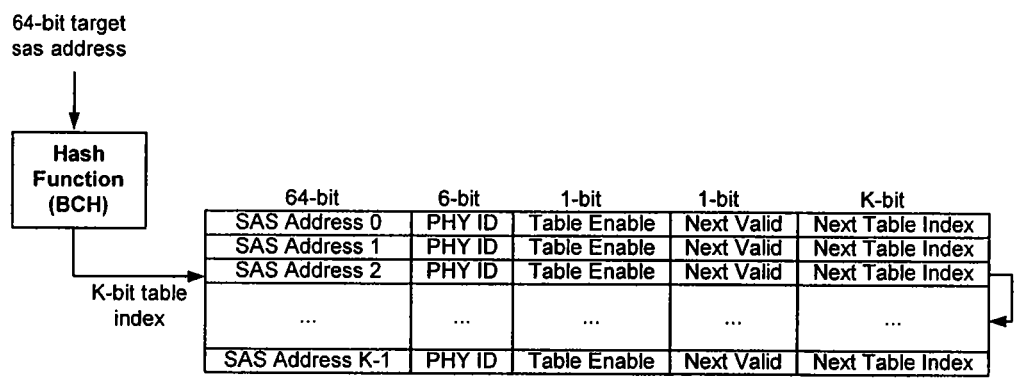
FIG. 9 shows a table route storage memory.

FIG. 9 shows the content of the table route storage. A preferred design may be one that supports 1024 table entries, therefore K equals 10-bit. Each table entry should include a 64-bit SAS address, a phy id, a table enable bit, a next valid bit and a 10-bit next table index. The phy id indicates to which phy the current SAS address belongs. The table enable bit is used to indicate if the current SAS address is active. If an end device is unplugged from the system, the SMP discovery function reports that the current SAS address is not available in the system and hence, the table enable bit is set to '0' to remove the SAS address from table routing. The next valid bit is used to indicate if the current table entry is at the end of the link list. It is possible to have more than one SAS address to generate the same table index using 64-bit to 10-bit hash function. When this situation happens, the first SAS address that is written to the table route storage uses the table index generated by the hash function. The subsequent SAS address is written to the free table entry that is indicated by the next table index. Thus a link list structure is created to resolve the possibility that multiple SAS addresses may be hashed to the same table entry using the 64-bit to 10 bit hash function. The next valid bit set to '0' indicates the end of the link list.

The search engine (313) performs two major functions including: 1. Performing target SAS address search; and 2. Prioritizing the open request frame. The Routing Lookup block (325) is used to perform the target SAS address lookup so that the open request can be routed to the request target phy. The Request Compare block (324) is used to prioritize the open request frame so that the highest priority open frame will be served first in the arbitration cycle.

Principles of the Routing Lookup Block (325) will now be described. As a premise though, it should be understood that the SAS related ANSI standard adopts three routing mechanisms: direct routing, table routing, and subtractive routing. When performing the target SAS address lookup, the ECM searches through the end devices that are directly attached to the current expander. If there is a SAS address match, a direct match is declared and the open frame is able to route to the target phy that the end device is attached to. If no direct match is found, the ECM searches through the end devices that are connected to other expanders through table routing. A table match is declared if the target SAS address is found from the routing table and the open frame is routed to the expander that is attached to the target phy indicated by the SAS address in the routing table. If no table match is found, the requested open frame is routed to the subtractive phy if subtractive routing is enabled.

Figures 10, 11:
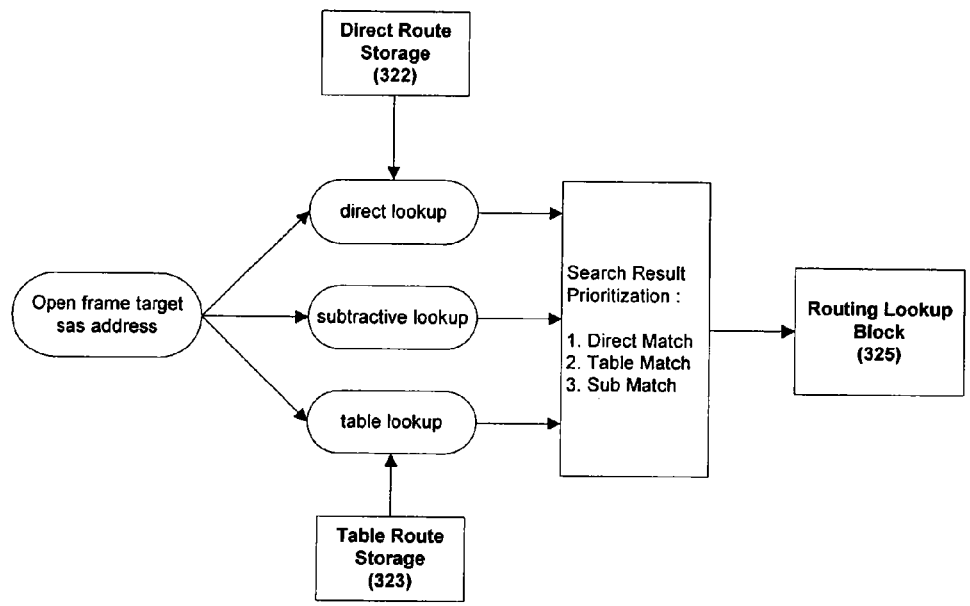
FIG. 10 shows a flowchart of the routing lookup process.
FIG. 11 shows a memory content of the routing lookup block.

FIG. 10 illustrates a routing lookup process that is performed by the ECM according to an embodiment of the present invention. For every open request, the target SAS address of the open frame will be compared to the SAS address in the direct route storage. The direct match flag is set if an SAS address match is found in the direct route storage and the wide-port configuration (pa_map) data will be fetched and stored in the routing lookup block. The wide-port configuration data is used to inform the arbitration process to arbitrarily select the idle or lowest priority target phy to connect to if the target device is attached to the expander through multiple phys.

The target SAS address will also be compared to the SAS address in the table route storage if there is no direct match found in the direct lookup process. The table match flag is set if a SAS address match is found in the table route storage. The PHY ID of the associated table entry will be used to fetch the wide-port configuration (pa_map) data from the direct route storage and stored in the routing lookup block. If there is no direct match or table match but subtractive routing is enabled, the sub match flag is set and the wide-port configuration data of the subtractive phy will be fetched and stored in the routing lookup block.

FIG. 11 illustrates the memory content of the routing lookup block. An expander can process up to N open frames if all the phys are requesting at the same time. Therefore, the routing lookup block should be able to buffer up to N entries of lookup result that will be used in the arbitration process.

The Request Compare Block (324) performs 2 major tasks including: 1. computing the arbitration C matrix based on the arbitration priority; and 2. computing the pathway recover P matrix based on the pbc priority. The least-recently used arbitration fairness and pathway recovery rules are defined in the SAS spec to arbitrate the OPEN requests from the end devices. The least-recently used arbitration fairness states that the longer the open request has been queuing up, the higher priority request will win the arbitration. The arbitration priority comprises three parameters: the Arbitration Wait Time (AWT), the request PHY SAS Address, and the Connection Rate (CONNRATE). Table 1 and Table 2 illustrate the arbitration priority for the OPEN and RETRY OPEN request.

TABLE 1

Request Arbitration Priority for OPEN request

| Bit[83:68] (83 is MSB) | Bit[67:5] | Bit[3:0] (0 is LSB) |
|---|---|---|
| 16-bit Arbitration Wait Time | 64-bit source SAS Address | 4-bit Connection Rate |

TABLE 2

Request Arbitration Priority for RETRY OPEN request

| Bit[83:68] (83 is MSB) | Bit[67:5] | Bit[3:0] (0 is LSB) |
|---|---|---|
| Ignored Arbitration Wait Time | 64-bit source SAS Address | 4-bit Connection Rate |

When two or more OPEN request PHY requests are to be connected to the same target PHY, the ECM selects the winner by comparing the request arbitration priority as shown in Table 2. The request PHY with the highest arbitration priority is granted the right to make the connection first. However, if an OPEN request has previously been rejected by the expander, the requesting PHY can increase the priority of the OPEN request by issuing an RETRY OPEN request. When a RETRY OPEN request is received, the 16-bit AWT will be ignored and the arbitration priority is the combination of source SAS Address and Connection Rate. When two or more RETRY OPEN request PHY requests are to be connected to the same target PHY, the ECM selects the winner by comparing the request arbitration priority as shown in Table 2. When an OPEN request PHY and a RETRY OPEN request PHY request to be connected to the same target PHY, the ECM grants the RETRY OPEN request PHY the right to make the connection first.

Figure 12:
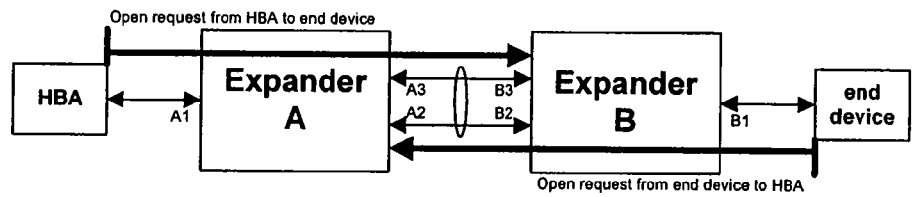
FIG. 12 is an example of deadlock condition that requires pathway recovery.

The pathway recovery rule is designed to prevent possible request lockup when both the source and target PHYs are requesting connection for each other over multiple expanders. A simple example of the deadlock condition is shown in FIG. 12. An HBA has a narrow connection to the port A1 in Expander A whereas an end device is attached to port B1 in Expander B. The Expander A and Expander B are wide port connections that have 2 links between them. This assumes that both the HBA and the end device are targeting for each other. The Expander A grants the connection to the open request from the HBA at the same time as the Expander B grants the connection to the open request from the end device. The open request from the HBA reaches port B3 sees the port B1 is blocked and therefore waits for the path to be released in Expander B. At the same time, the open request from the end device reaches port A2 sees the port A1 is blocked and also waits for the path to be released in Expander A. This creates a deadlock condition as both open requests are waiting for each other to finish connection and release the path.

The Pathway Recovery rule provides a mechanism to abort the connection requests in order to prevent deadlock using pathway recovery priority comparisons. The pathway recovery priority compares the OPEN address frames of the blocked connection requests as described in Table 3. When the Partial Pathway Timeout timer for a request PHY expires, the ECM rejects the connection request if the pathway recovery priority of the requesting PHY is less than or equal to the pathway recovery priority of any of the targeted PHYs within the destination port (either narrow or wide port) that are sending PHY Status (Blocked Partial Pathway) responses to the ECM.

TABLE 3

Pathway Recovery Priority for OPEN/RETRY OPEN request

| Bit[71:64] (71 is MSB) | Bit[63:0] (0 is LSB) |
|---|---|
| 8-bit Pathway Blocked Count | 64-bit source SAS Address |

As shown in FIG. 12, the open request from HBA reaches the port B3 and is waiting for connection to port B1. The PHY Status of the port A1, A3 and B3 are initially set to Partial Pathway as the HBA is setting up connection to the end device. Similarly, the open request from end device reaches the port A2 with the sub-connected port B1, B2 and A2 which PHY Status are set to Partial Pathway. In Expander B, the open request in port B3 will send an AIP (waiting on partial) primitive back to the HBA when it sees the port B1 has PHY Status Partial Pathway. This will cause the port B3, A2 and A1 to change the PHY Status to Blocked Partial Pathway as they received AIP (waiting on partial). The open request from the end device will experience the same and eventually the port B1 will change the PHY Status to Blocked Partial Pathway. When the open request in port B3 sees the PHY Status of Blocked Partial Pathway in the port B1, it will start the partial pathway timeout timer. When the timer expires and the port B1 is still in Blocked Partial Pathway state, the ECM in Expander B will perform the pathway recovery priority comparison for the open requests.

The pathway recovery priority of the open request from the HBA is assumed to be greater than the pathway recovery priority of the open request from the end device. When the partial pathway timeout timer is expired in port B3, the ECM in Expander B will perform the partial pathway recovery rule but will not reject the open request from HBA. When the partial pathway timeout timer is expired in port A2, the ECM in Expander A will also perform the partial pathway recovery rule and reject the open request from the end device. Thus, the port A2, B2 and B1 will become available and the open request from the HBA can be connected to the end device.

Figure 13:
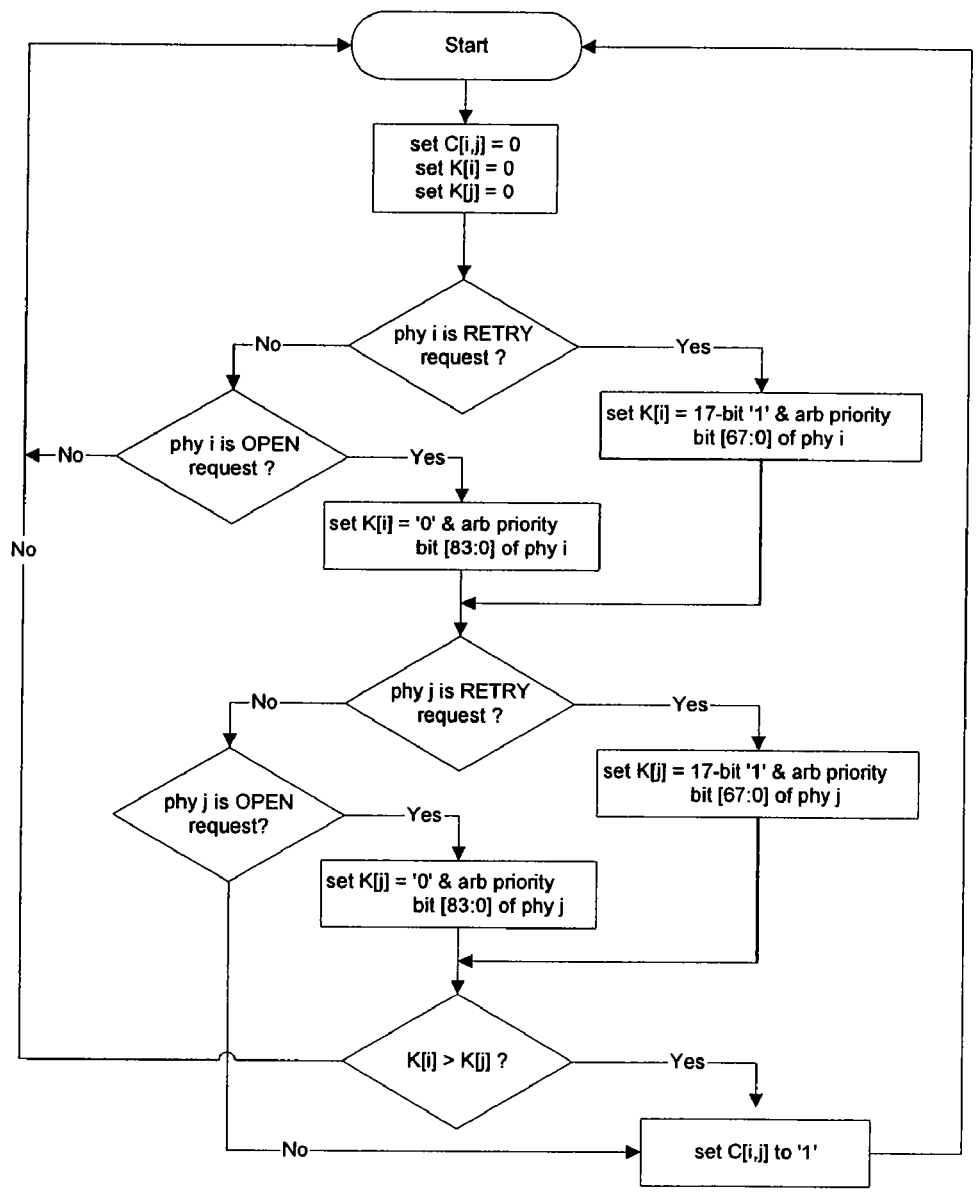
FIG. 13 is a comparison flow diagram for each CI,j bit.

As mentioned earlier, the arbitration priority key typically includes 3 parameters with total of 84-bits. The total arbitration key K can be increased to 85-bit by merging the OPEN request and RETRY request into the same equation. A RETRY request will set the most significant 17-bit (1-bit RETRY and 16-bit AWT) of the arbitration key K is to '1'. For an expander with N input phys, we can define a master set of $\{K_0, K_1, K_2, \ldots, K_{N-1}\}$ where $K_x$ is the arbitration priority key of phy X. If there is no open request from an input phy, the arbitration priority key value is set to 0. From the master set, we can compute a two dimension Arbitration C Matrix such that the priority relationship between each arbitration key can be stored and be used to find the highest or lowest priority open request in the arbitration cycle. The matrix $C_{[N-1][N-1]}$ consists of N rows×N columns which value can be defined as:

$$C_{[i][j]} = 1 \text{ if } (K_{[i]} > K_{[j]}) \text{ otherwise } 0$$

where i=number of row and $0 \leq i \leq N-1$
j=number of column and $0 \leq j \leq N-1$ Therefore, the matrix C is a two dimension vector consists of N×N logical variables defined as:

$$C_{STEP1} = \begin{bmatrix} C(K_0 > K_0) & C(K_0 > K_1) & C(K_0 > K_2) & \cdots & C(K_0 > K_{N-1}) \\ C(K_1 > K_0) & C(K_1 > K_1) & C(K_1 > K_2) & \cdots & C(K_1 > K_{N-1}) \\ C(K_2 > K_0) & C(K_2 > K_1) & C(K_2 > K_2) & \cdots & C(K_2 > K_{N-1}) \\ \cdots & \cdots & \cdots & \cdots & \cdots \\ C(K_{N-1} > K_0) & C(K_{N-1} > K_1) & C(K_{N-1} > K_2) & \cdots & C(K_{N-1} > K_{N-1}) \end{bmatrix} \quad (1)$$

$$C_{STEP1} = \begin{bmatrix} C_{0,0} & C_{0,1} & C_{0,2} & \cdots & C_{0,N-1} \\ C_{1,0} & C_{1,1} & C_{1,2} & \cdots & C_{1,N-1} \\ C_{2,0} & C_{2,1} & C_{2,2} & \cdots & C_{2,N-1} \\ \cdots & \cdots & \cdots & \cdots & \cdots \\ C_{N-1,0} & C_{N-1,1} & C_{N-1,2} & \cdots & C_{N-1,N-1} \end{bmatrix}$$

where i is an integer $0 \leq i \leq N-1$
j is an integer $0 \leq j \leq N-1$
$C_{[i][j]}$ is a logical variable 0 or 1
$C_{[i][j]} = 1$ when $K_i > K_j$
   $= 0$ when $K_i \leq K_j$ FIG. 13 shows a comparison flow diagram to generate each bit of the C matrix according to an embodiment of the present invention. The generation of the Pathway recovery Matrix is more complicated than the arbitration C matrix. The pathway recovery rule only applies when the target destination phy is in pathway blocked condition. This means that the crossbar of the target phy is in connection but the target link processor indicates the target phy is in pathway blocked status. When this condition happens, the request open frame will not be rejected if the pathway recovery priority P of the request open frame is greater than the pathway recovery priority of all the target phys.

Figure 14:
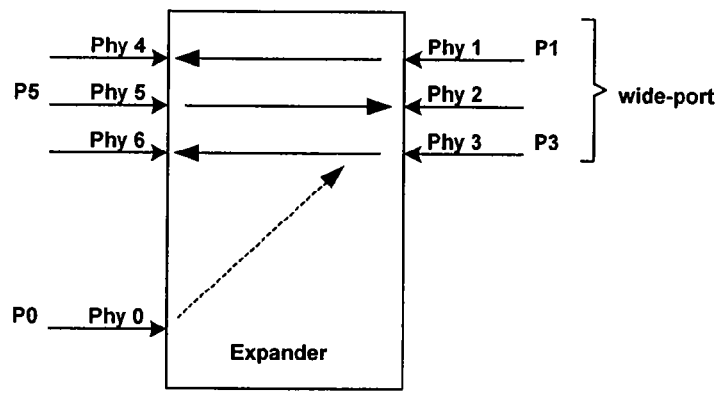
FIG. 14 is a pathway recovery comparison of a wide-port.

FIG. 14 illustrates a simple example of an open request from phy 0 waiting for the connection to wide-port phy 1, phy 2 and phy 3 according to an embodiment of the present invention. However, all of the phy 1, phy 2 and phy 3 are in pathway blocked state with phy 1 having an open request connected to phy 4, phy 2 having received an open request connected to phy 5, and phy 3 having an open request connected to phy 6. In this case, the pathway recovery priority of P0 must be greater than P1, P3 and P5, otherwise the open request from phy 1 will be rejected. Note that phy 2 did not have open request but received open request from phy 5, therefore P5 should be used as the priority key for phy 2.

Figure 15:
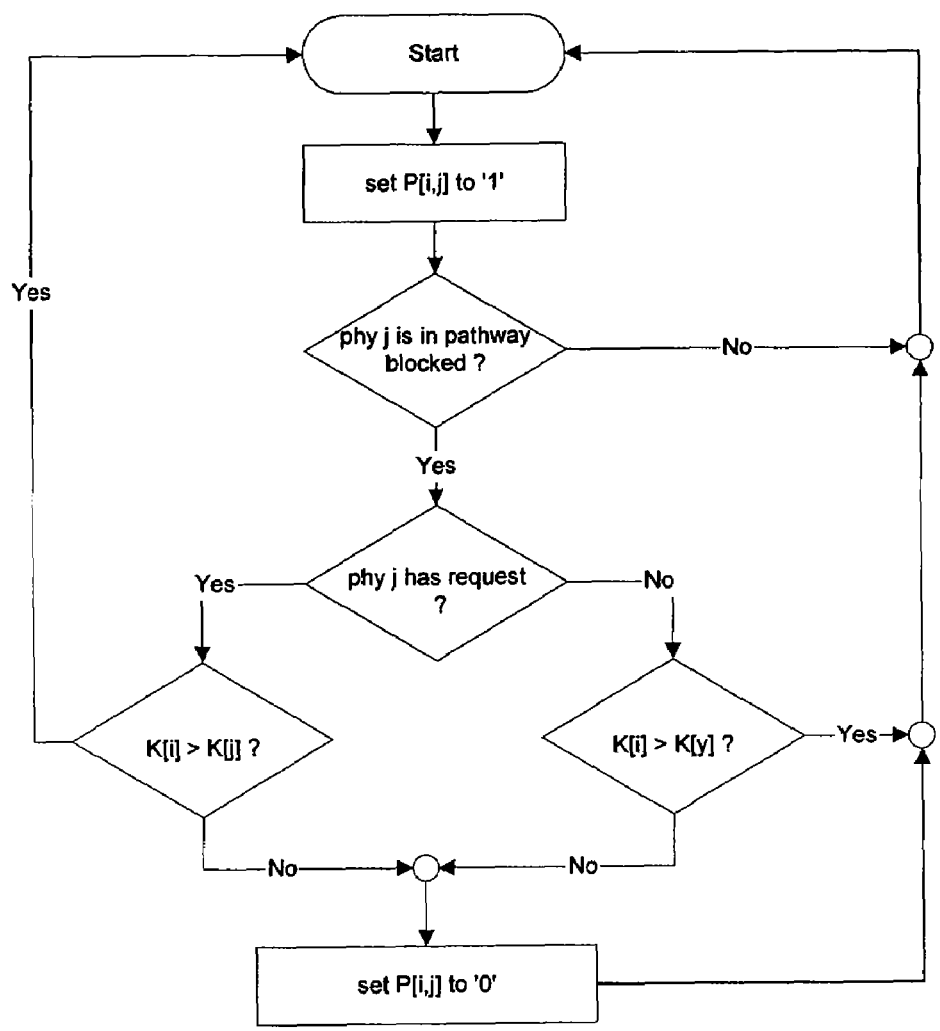
FIG. 15 is a comparison flow diagram for each PI,j bit.

For an expander with N input phys, a master set of $\{K_0, K_1, K_2, \ldots, K_{N-1}\}$ can be defined where $K_x$ is the pathway recovery priority key of phy X. If there is no open request from an input phy, the pathway recovery priority key value is set to 0. From the master set, a two dimension Pathway Recovery Matrix can be computed such that the priority relationship between each phy can be used to determine the pathway reject condition in the arbitration cycle. The matrix $P_{[N-1][N-1]}$ consists of N rows×N columns which value is defined as:

$P_{[i][j]} = 1$, if $(K_{[i]} > K_{[j]})$ when target phy j has open request or 1, if $(K[i] > K[y])$ when target phy j has open request received from phy y or 0, otherwise where i=number of row and $0 \leq i \leq N-1$
j=number of column and $0 \leq j \leq N-1$ FIG. 15 shows a comparison flow diagram to generate each bit of the P matrix according to an embodiment of the present invention The Arbiter (314) will now be described. As a premise though, it should be understood that the SAS related ANSI standard requires that the ECM arbitrate the OPEN or RETRY OPEN request from all PHYs and issues a confirmation result as shown in Table 4.

TABLE 4

| Arbitration Result | Description |
| --- | --- |
| Arbitrating (Normal) | Confirmation that the ECM has received the Request Path request. |
| Arbitrating (Waiting On Partial) | Confirmation that the ECM has determined that: |
| | a) there is a destination port capable of routing to the requested destination SAS address; |
| | b) at least one phy within the destination port supports the requested connection rate; |
| | c) each of the phys within the destination port is returning a Phy Status (Partial Pathway) or Phy Status (Blocked Partial Pathway) response; and |
| | d) at least one of the phys within the destination port is returning a Phy Status (Partial Pathway) response. |
| Arbitrating (Blocked On Partial) | Confirmation that the ECM has determined that: |
| | a) there is a destination port capable of routing to the requested destination SAS address; |

TABLE 4-continued

| Arbitration Result | Description |
|---|---|
| | b) at least one phy within the destination port supports the requested connection rate; <br> c) each of the phys within the destination port is returning a Phy Status (Blocked Partial Pathway) response. |
| Arbitrating (Waiting On Connection) | Confirmation that the ECM has determined that: <br> a) there is a destination port capable of routing to the requested destination SAS address; <br> b) at least one phy within the destination port supports the requested connection rate; <br> c) each of the phys within the destination port is returning a Phy Status (Partial Pathway), Phy Status (Blocked Partial Pathway) or Phy Status (Connection) response; and <br> d) at least one of the phys within the destination port is returning a Phy Status (Connection) response. |
| Arb Won | Confirmation that an expander phy has won path arbitration. |
| Arb Lost | Confirmation that an expander phy has lost path arbitration. |
| Arb Reject (No Destination) | Confirmation that the ECM did not find an operational expander phy capable of routing to the requested destination SAS address. |
| Arb Reject (Bad Destination) | Confirmation that the ECM has determined that the requested destination SAS address maps back to the requesting port. |
| Arb Reject (Bad Connection) | Confirmation that the ECM has determined that there is a destination port capable of routing to the requested destination SAS address but no phys within the destination port are configured to support the requested connection rate. |
| Arb Reject (Pathway Blocked) | Confirmation that the ECM has determined that the requesting expander phy should back off according to SAS pathway recovery rules. |

Figure 16:
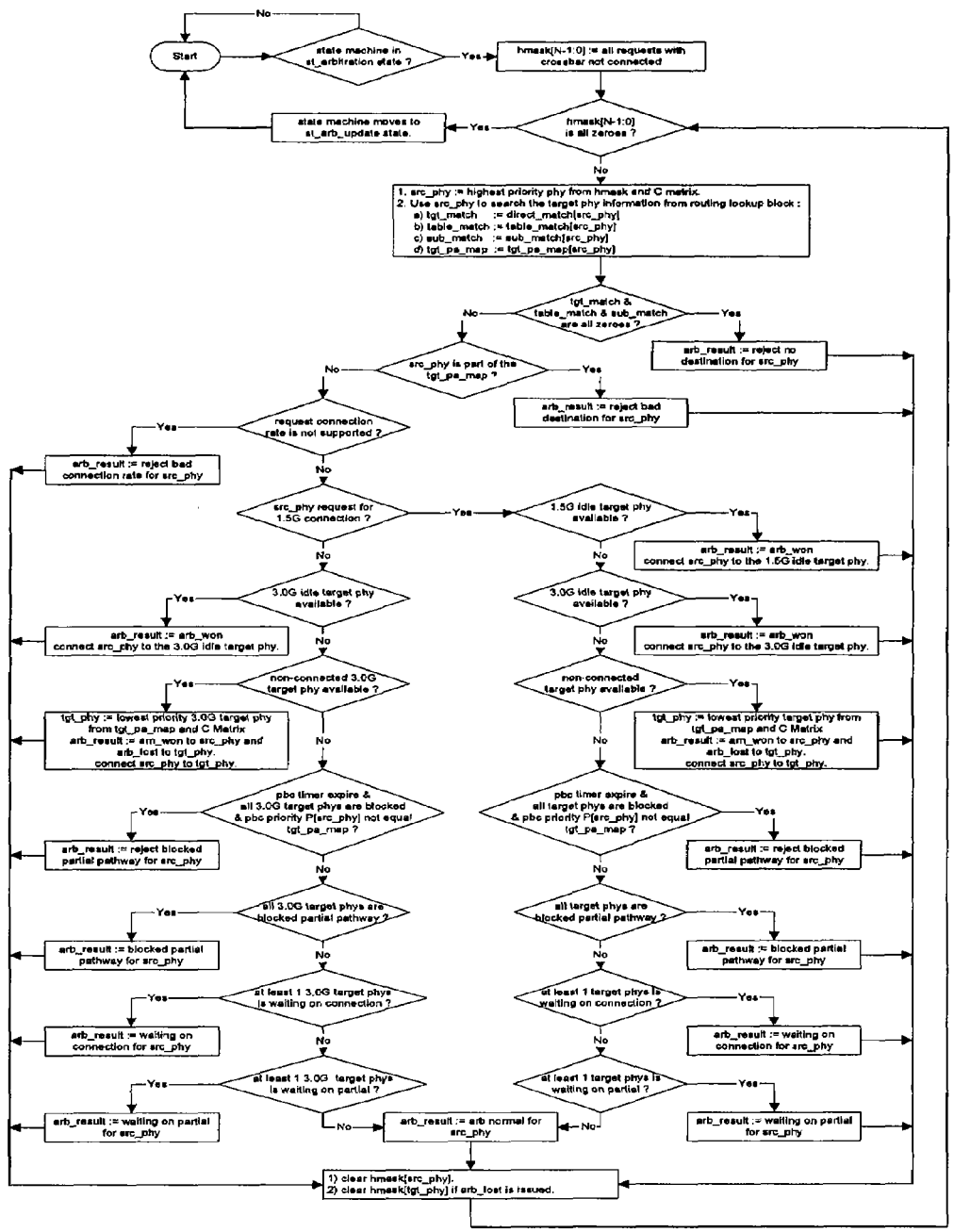
FIG. 16 is a detailed flow chart of the arbitration process in accordance with the preferred embodiment of the present invention.

FIG. 16 illustrates a flow chart of an arbitration process according to an embodiment of the present invention that is in the Arbitration Block (326). The ECM state machine will move to the ST_ARBITRATION state after finish comparing the open/retry request from all the requesting PHYS. In the ST_ARBITRATION state, the ECM will arbitrate the request(s) from the highest arbitration priority phy down to the lowest arbitration priority phy one at a time. After all the requests have been arbitrated, the ECM state machine will move to the ST_ARB_UPDATE state to send the confirmation result to all the requesting phys simultaneously. The Arbitration Result Generator (327) is used to register the arbitration result produced by the arbitration block (326) and send them to the request phys in arbitration update cycle.

While in the ST_ARBITRATION state, the ECM will look at all the OPEN/RETRY request PHYs whose crossbar are not connected. These requests are registered as the N-bit $H_{MASK}$ signal. If $H_{MASK}$ [x] is set to 1, this indicates that Phy x has an open request that is waiting to be connected to the target phy. The ECM will then proceed to search for the highest arbitration priority Phy using the $H_{MASK}$ and C Matrix. Details of the highest priority search algorithm is described in and co-pending U.S. patent application Ser. No. 11/389,025 filed on Mar. 27, 2006, entitled "Method And Apparatus For Finding Subset Maxima And Minima In SAS Expanders and Related Devices" which claims priority from U.S. Provisional Patent Application Ser. No. 60/666,723 filed on Mar. 31, 2005, each of which is incorporated herein by reference.

Figure 17:
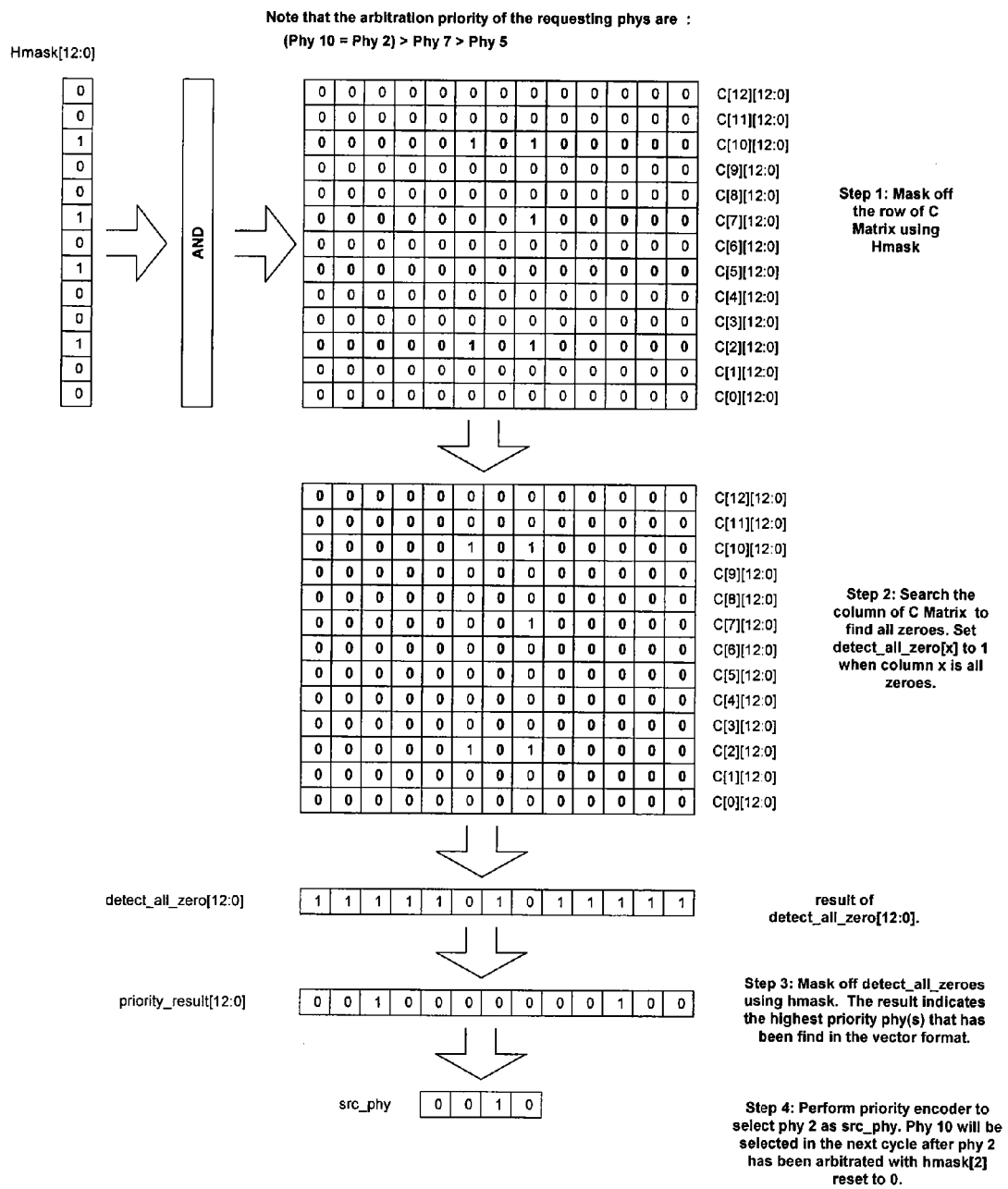
FIG. 17 is an exemplary method for searching for the highest priority phy from a C matrix.

FIG. 17 shows an example of how the highest priority phy can be found according to an embodiment of the present invention. Assume that phy 2, phy 5, phy 7 and phy 10 are sending open request to a 12-port expander. Phy 2 and Phy 10 both have equal highest priority whereas phy 7 has the second highest priority and phy 5 has the lowest priority. The first step of the search mechanism is to mask off the row of the C matrix using $H_{MASK}$. This is done to remove the request phys who have been previously arbitrated or did not have an open request. The second step is to search for all zeroes vector in the column of the C matrix. An all zeroes in the column 'x' indicates that phy 'x' is either not requesting or has the highest priority. The detect_all_zero[x] bit is set to '1' if the column 'x' has all zeroes vector. The third step is to mask the detect_all_zero signal with $H_{MASK}$ so that the detect_all_zero[x] bit will be set to '0' if the phy did not request for a connection. The result of step 3 (priority_result[12:0] as shown in FIG. 17) indicates the phy with the highest arbitration priority. The final step is to perform priority encoder to choose the lowest phy number as the highest priority phy (src_phy). It is possible that there is more than one requesting phy that has the same arbitration priority that is also the highest priority of the search result. In our example, both phy 10 and phy 2 are the highest priority so phy 2 is selected as src_phy.

The ECM will then search for the direct routing, table routing and subtractive routing result from the routing lookup block using the src_phy. The ECM will issue arbitration result of reject (No Destination) if it cannot find a target SAS address match in the direct, table and subtractive routing. If a match is found but the src_phy is part of the target wide port, the ECM will issue arbitration of reject (Bad Destination). If the request connection rate is reserved or the request connection rate is 3.0G but the target phy only supports 1.5G connection rate, the ECM will issue arbitration of reject (Bad Connection Rate).

The ECM will issue arb_won result and attempt to connect the crossbar from the src_phy to the target phy if the ECM did not reject the open request as mentioned above. For 1.5G request, the ECM will first look for an idle 1.5G target phy to make the connection. An idle target phy means that there is no open or retry open request from the target phy and its crossbar is not in connection. If there is no idle 1.5G target phy available, the ECM will then try to connect to the idle 3.0G target phy if available. If there is no idle target phy available but there is an unconnected target phy (with open or retry open request), then ECM will search through the C Matrix again to find the lowest priority phy that the src_phy can connect to.

The lowest priority phy lookup mechanism is similar to the highest priority lookup by swapping the column and row operation. The ECM will mask off the column (row for highest priority lookup) of the C Matrix using tgt_pa_map signal. Then the ECM will search for all zeroes vector in the row (column for highest priority lookup) of the C Matrix and set the detect_all_zero signal. The lowest priority target phy is found by priority encoding the mask-off detect_all_zero signal with the req_valid_map signal. When connecting the src_phy to the lowest priority target phy (tgt_phy), arb_won is issued to the src_phy whereas arb_lost is issued to the tgt_phy.

If all the target phys are blocked in the blocked partial pathway status, the ECM will attempt to perform the pathway recovery rule. If the pbc timeout timer is expired for the src_phy, and the pathway recovery priority of the src_phy (P[src_phy]) is not equal to the tgt_pa_map (indicates the pathway recovery priority of the source phy is not greater than all the target phys in the wide-port), the ECM will issue arbitration result reject (Pathway Blocked).

If the source phy will not be rejected by the pathway recovery rule, the ECM will issue arbitration result blocked partial pathway, waiting on connection, waiting on partial or arbitrating normal depending on the phy status of the target phy(s) as shown in FIG. 16. Once the ECM has determined an arbitration result for the source phy, the ECM will reset the src_phy associated bit in the $H_{MASK}$ signal and also reset the tgt_phy associated bit in the $H_{MASK}$ if an arb_lost is issued. This process will be repeated until all the request phys have been arbitrated. The state machine will move to ST_ARB_UPDATE state to send the arbitration result to all the requesting phys through arbitration result generator.

The Expander Connection Manager/Router (ECMR) provides the switching data path for a SAS expander device. The Expander Connection Router (ECR) is a basic N×N mutiplexing (where N is the number of expander phys) data path that provides direct space switching among the ports. The ECR re-times the data both at the input and the output stage, but no data buffer is provided internal to the ECR. The ECR provides a 32-bit data path and a 3-bit flow control signal for data type identification, connection status and flow control information with the connected phy at each direction. Flow control is supported across the switch data path as long as the connected PHYs have enough buffer to support the two sysclk cycle latency across the switch per direction.

The ECMR datapath can provide thirty-seven ECR bus interfaces for attachment of SXL link layer TSBs at each port. The ECR bus interface allows one link processor to exchange data, request/response, response and confirmation information with another link processor through the ECMR switch core for connection management when outside connection and for switching data/primitive when inside connection.

The connection and disconnection of the ECR crossbar is based on the arbitration result of the Expander Connection Manager (ECM). When the open frame from a source phy has won the connection, the ECM will send the enable signal to the ECR and connect the crossbar between the source phy and target phy. This allows the link processors to talk to each other and setup the data path if the open frame from the source phy is accepted by the target phy. When the end devices have finished the data transmission and decide to tear down the connection, or in special case where any of the end device is removed from the expander or a break is issued by the end device, the link processor will acknowledge the ECM and the crossbar release signal (ecm_release) will be sent to the ECR to tear down the connection. After the crossbar between the source phy and the target phy has been torn down, the ECM will respond with the ecm_release_done signal to the request phy. The protocol to tear down the connection is handled by the ecm_release and ecm_release_done handshake between the link processor and the ECM.

Two types of release handshake protocol can be provided. They include the Interlock Release Handshake and the Non-Interlock Release Handshake.

Interlock Release Handshake includes the ECR switch controller in a particular product is designed to Interlock the data path between the source phy and target phy and will only be torn down after the ecm_release signals from both the source and target phys are received by the switch controller. The ECR will not remove the connection if only one ecm_release signal from either phy is asserted. In such case, the ECMR interrupt will be set if the ecm_release signal from one phy is asserted for too long without receiving the release signal from the peer connected phy. The ECMR will then rely on the firmware to resolve the lockup condition by resetting the crossbar through ECBI registers.

Figure 18:
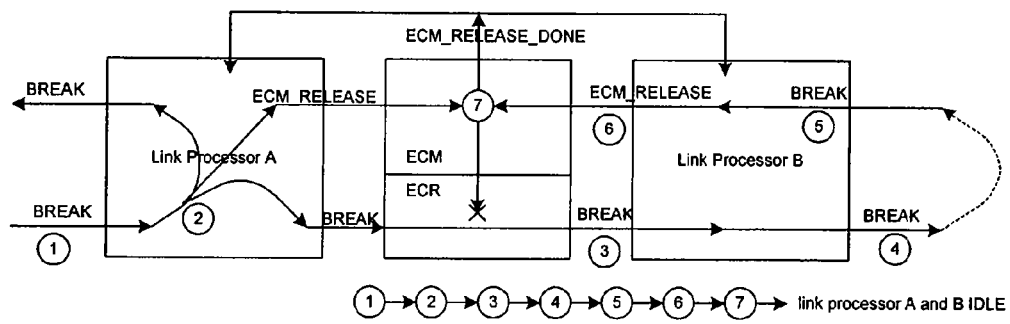
FIG. 18 is a diagram illustrating breaking action for releasing the interlock crossbar.
Figure 19:
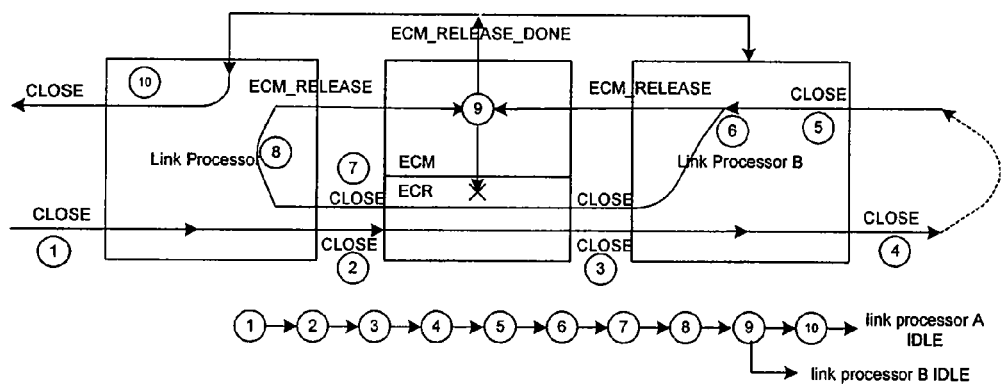
FIG. 19 is a diagram illustrating closing action for releasing the interlock crossbar.

FIG. 18 presents a sequence of actions performed by the Link Processors and the ECM to break a connection according to an embodiment of the present invention. FIG. 19 presents a sequence of actions performed by the Link Processors and the ECMR to close a connection according to an embodiment of the present invention. The advantage of using the interlock mechanism is to keep both the connected link processors synchronous. The disadvantage is that in the break condition, the break primitive has to transmit from the source phy through the expander (or multiple expanders) to the target phy, waiting for the response from the target phy before the connection can be torn down. This may take a longer time to release the connection in the break condition.

Non-Interlock Release Handshake includes the ECR switch controller in another product is designed not to interlock the data path between the source phy and target phy when performing release handshake. This means that when the ECMR receives a crossbar release signal from one link processor, the ECM will respond with the ecm_release_done signal to the request phy and tear down the crossbar without waiting for the crossbar release signal from the other connected link processor. Though the crossbar is torn down, the ECR switch controller will block any open request to the blocked phy that has not generated the release signal to the ECMR. The blocked phy will only be available for new open request connection when the link processor of that phy has generated the crossbar release signal to the ECMR. The non-interlock design can significantly reduce the wait time in the connection break condition that the break primitive has to be transmitted from one end device to the target end device and back to the source end device again before the connection can be torn down.

Figure 20:
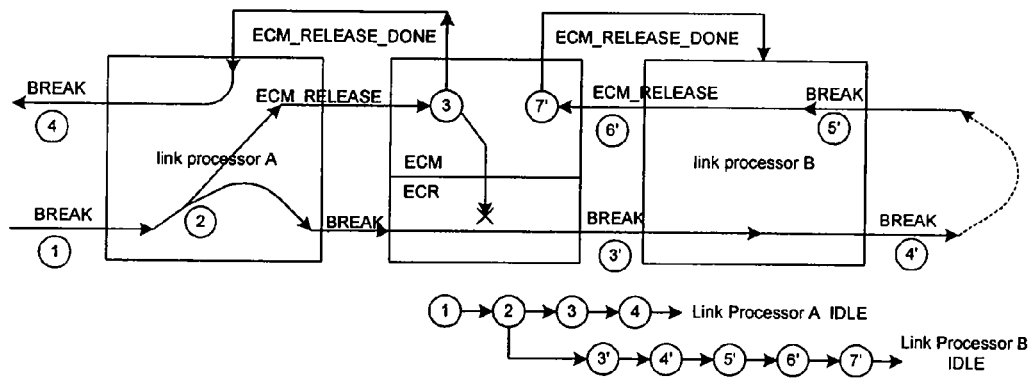
FIG. 20 is a diagram illustrating breaking action for releasing the non-interlock crossbar.

FIG. 20 presents a sequence of actions performed by the Link Processors and the ECM to break a connection according to an embodiment of the present invention. The way the connection is broken potentially frees up the link processor A to generate or receive open request from other phys before the BREAK primitive is received from link processor B. The link processor A will be able to generate the break primitive back to the end device that initiates the break primitive in a shorter time frame when the crossbar has released the connection.

Figure 21:
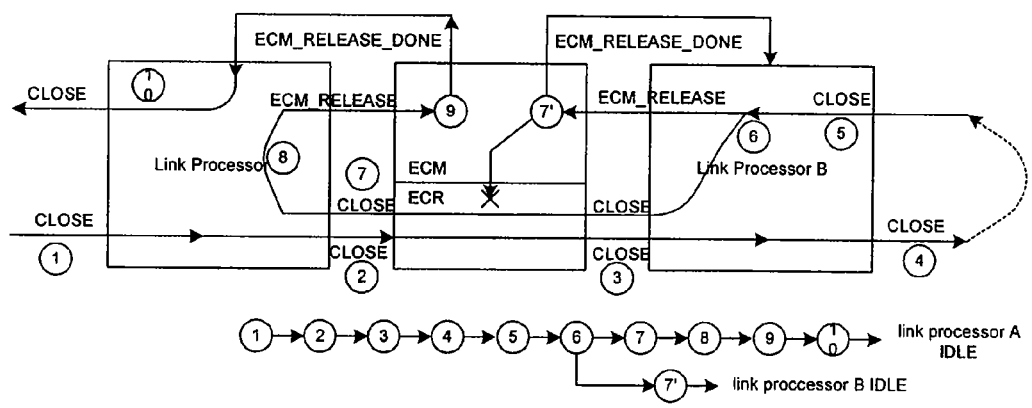
FIG. 21 is a diagram illustrating closing action for releasing the non-interlock crossbar.

FIG. 21 presents a sequence of actions performed by the Link Processors and the ECMR to close a connection according to an embodiment of the present invention. The way the connection is broken did not provide too much time saving as the close primitive has to be transmitted from one end device to the other end device and back to the original end device. For the non-interlock scheme to work properly, the link processor preferably transmits a BREAK or CLOSE primitive at the same time ECM_RELEASE signal is asserted. This allows the break or close primitive to be able to send through the crossbar before the connection is released by the switch controller.

Figure 22:
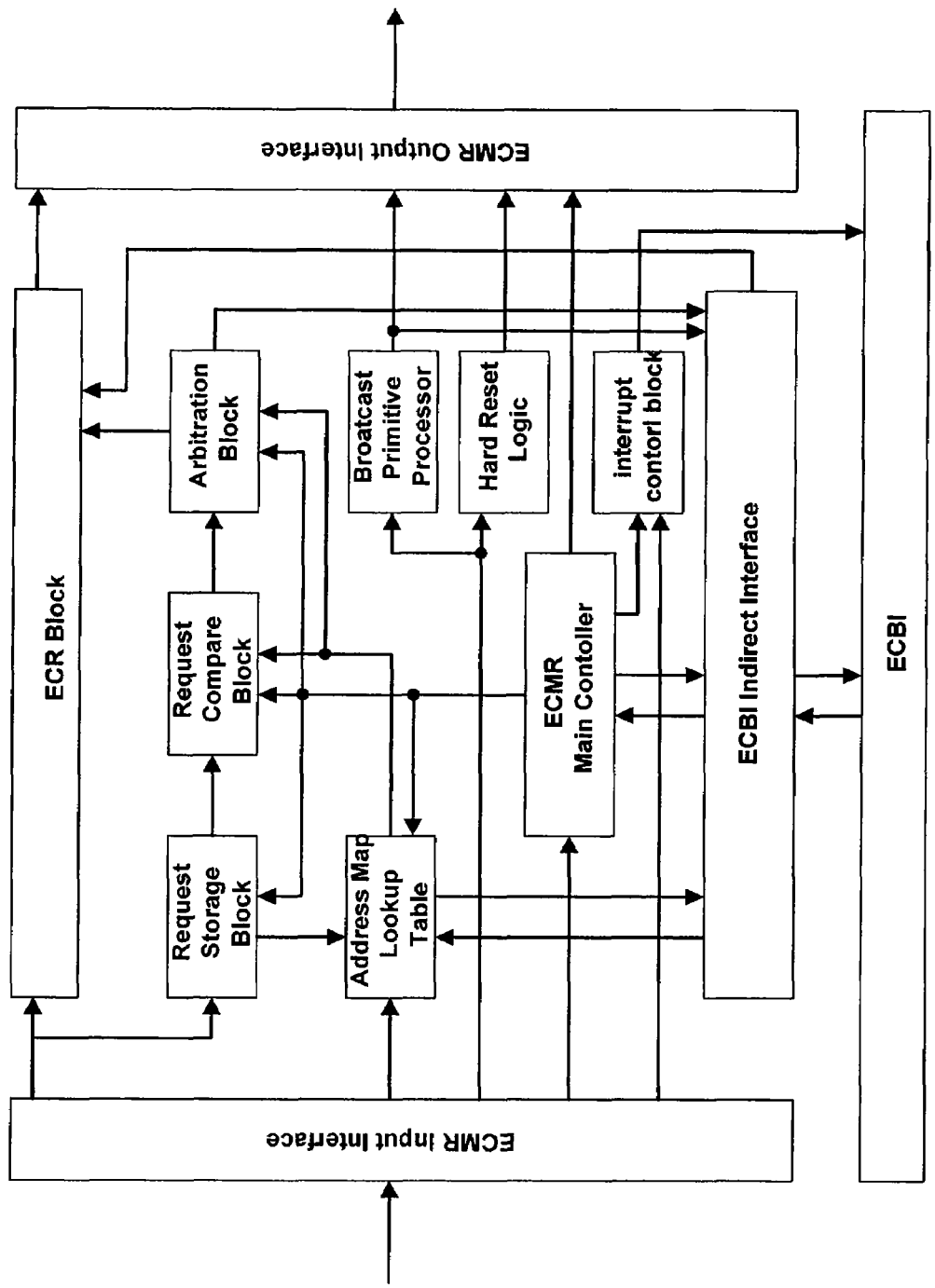
FIG. 22 is an illustration of one particular implementation the present invention within a 12-port expander.

Embodiments of the present invention can be implemented in an Application Specific Standard Integrated Circuit Product (ASSP). The Search Engine can be implemented in a functional block (TSB) called ECMR, which incorporates the functionality of Expander Connection Manager (ECM), Expander Connection Router (ECR) and Broadcast Primitive Processor (BPP). Block diagrams of the core logic for the ECMR in a 12 port implementation is shown in FIG. 22. Other products, such as 24 or 36 port SAS Expanders, also may implement a mechanism according to an embodiment of the present invention in an ECMR_LT block.

In summary, embodiments of the present invention provide a mechanism to manage the SAS expander connection. The method includes implementing a main controller state machine. The method can implement a bus sharing mechanism where the ECR crossbar is used to: load identify or open frame into ECM storage block when not in connection; enable data transmission between end devices when the link is in connection. The method can implement a direct route storage to memorize the end devices directly attached to the expander. The direct route storage can be updated and the wide-port configuration can be calculated. Table route storage can be used to memorize the SAS address of end devices attached in other expanders. A hash function can be used to store the SAS address in the table route storage. A mechanism can be provided to effectively search the SAS address from the table route storage using the hash function. The method can implement the link list structure to prevent different SAS addressed hashed into the same table entry. The mechanism can perform direct routing, table routing and subtractive routing. A C matrix and P matrix as described and illustrated can be computed. A search mechanism can be implemented to find the highest priority phy, or to find the lowest priority phy. The search mechanism can be implemented to find the pathway recovery priority from P matrix and perform the pathway recovery rule check. The mechanism can release handshake between the link processor and ECMR to close down a connection. The interlock ECR crossbar can be implemented to release the connection for both source and target phys at the same time. The non-interlock ECR crossbar can be implemented to asynchronously release the connection between the source and target phys.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of connection management in networked devices, said method comprising:
    routing data between said input and said output by way of an expander connection router arranged between said input and said output;
    arbitrating said routing of said data by way of an expander connection manager operatively coupled to said expander connection router and arranged between said input and said output;
    wherein said arbitrating step further includes
        (a) upon a state machine being within an arbitration state, determining whether all connection request PHYs are crossbar connected,
        (b) upon any of said connection request PHYs being crossbar connected, determining a highest arbitration priority PHY,
        (c) determining whether said highest arbitration priority PHY is part of a port associate map and identifying a request connection rate,
        (d) determining whether said request connection rate is supported, and
        (e) determining an arbitration result based at least upon whether said request connection rate is support and whether a target PHY is available.

2. The method as claimed in claim 1, wherein said expander connection manager includes a storage mechanism, a search engine, and an arbiter operationally synchronized by a main controller.

3. The method as claimed in claim 2, further including
    monitoring signals at said input via an idle state of a state machine within said main controller includes,
    selectively loading open and identity frames via a loading state of said state machine,
    looping through and identifying all identify frames via an identify state of said state machine,
    performing open request priority key comparison via a compare state of said state machine,
    performing arbitration among a priority list via an arbitration state of said state machine, and
    generating a result of said arbitration step via an arbitration result state of said state machine.

4. The method as claimed in claim 1 further including, alternatively,
    selectively loading, via a bus sharing mechanism, said open and said identity frames into said storage mechanism when no connection exists between said input and said output, and
    processing data transmission between said networked devices when a connection exists between said input and said output.

5. The method as claimed in claim 1 further including memorizing identities of said networked devices connected to said apparatus via a direct route storage mechanism.

6. The method as claimed in claim 5 further including updating said direct route storage mechanism and calculating an overall wide-port configuration via an update mechanism.

7. The method as claimed in claim 1 further including memorizing a device address of each said networked device via a table route storage.

8. The method as claimed in claim 7 wherein each said device address is stored in said table route storage via a hash function.

9. The method as claimed in claim 8 wherein each said device address is searchable from said table route storage via said hash function.

10. The method as claimed in claim 9 further including a link list structure to prevent different ones of each said device address from being hashed into any one given table entry of said table route storage.

11. The method as claimed in claim 10 wherein said networked device is a SAS device and said method is implemented within a SAS expander.

12. The method as claimed in claim 1 further including providing broadcast primitives between said input and said output of said apparatus by way of a broadcast primitive processor arranged between said input and said output.

* * * * *

UNITED STATES PATENT AND TRADEMARK OFFICE
CERTIFICATE OF CORRECTION

PATENT NO.         : 7,584,319 B1                                      Page 1 of 1
APPLICATION NO.    : 11/390182
DATED              : September 1, 2009
INVENTOR(S)        : Heng Liao et al.

It is certified that error appears in the above-identified patent and that said Letters Patent is hereby corrected as shown below:

Column 20, line 14, claim 3, delete "a" and insert therefor -- said --;

Column 20, line 16, claim 3, delete "identity" and insert therefor -- identify --;

Column 20, line 22, claim 3, delete "an" and insert therefor -- said --;

Column 20, line 24, claim 3, delete "an" and insert therefor -- said --; and

Column 20, line 29, claim 4, delete "identity" and insert therefor -- identify --.

Signed and Sealed this

Eighth Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,584,319 B1 Page 1 of 1
APPLICATION NO. : 11/390182
DATED : September 1, 2009
INVENTOR(S) : Liao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 597 days.

Signed and Sealed this

Fourteenth Day of December, 2010

David J. Kappos
*Director of the United States Patent and Trademark Office*